Jan. 7, 1936.  W. C. HEDGCOCK  2,026,534
TRUCK
Filed July 21, 1931  2 Sheets-Sheet 1
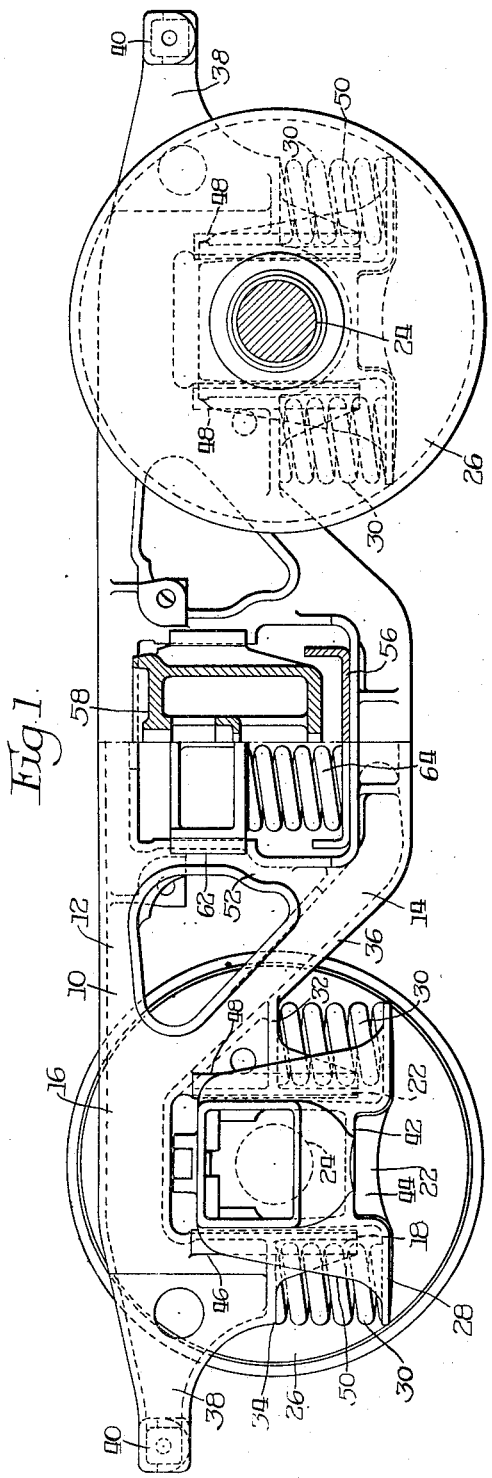
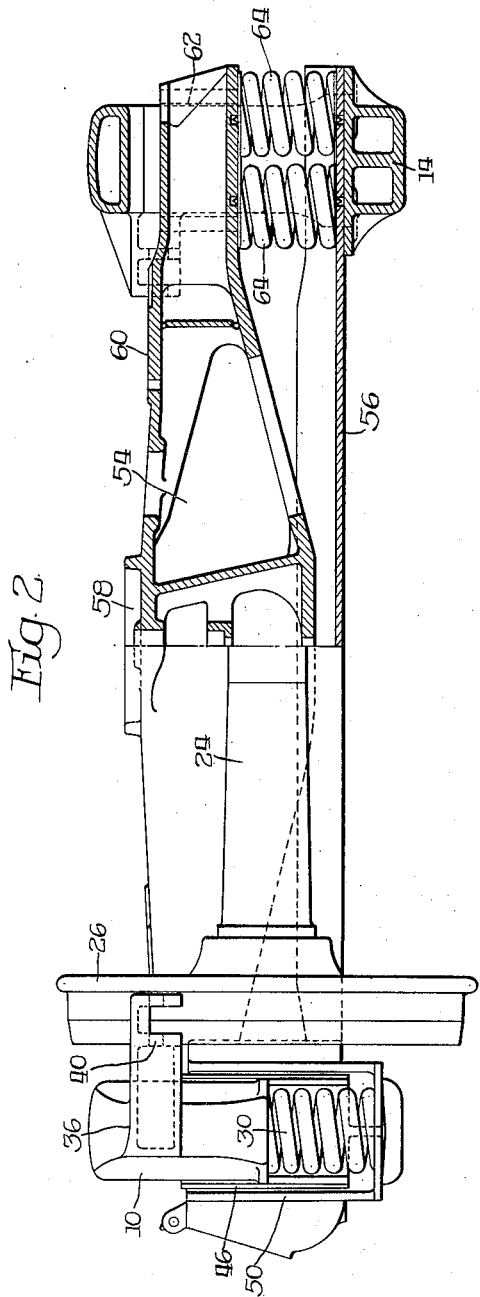
Inventor:
William C. Hedgcock
By Atkinson, Huxley, Byron & Hughes
Attys Jan. 7, 1936. W. C. HEDGCOCK 2,026,534
TRUCK
Filed July 21, 1931 2 Sheets-Sheet 2
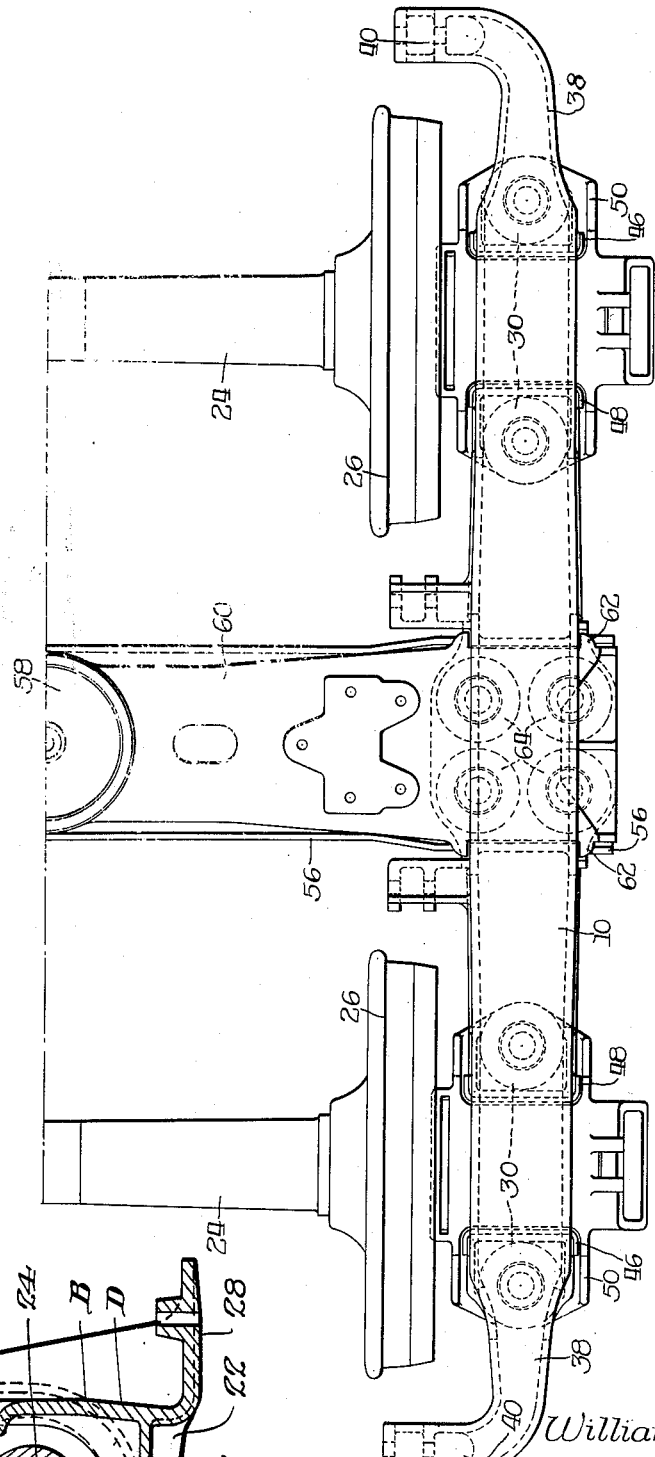
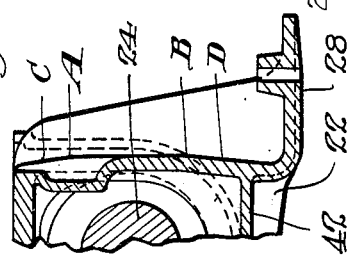
Inventor:
William C. Hedgcock Patented Jan. 7, 1936

2,026,534

UNITED STATES PATENT OFFICE 2,026,534

TRUCK

William C. Hedgcock, Wilmette, Ill., assignor to American Steel Foundries, Chicago, Ill., a corporation of New Jersey Application July 21, 1931, Serial No. 552,155

13 Claims. (Cl. 105—182)

This invention pertains to car trucks.

An object of this invention is to provide a car truck having easy riding qualities for the protection of the car and lading, and one which is adapted to permit of high speed operation without danger of derailment or damage.

Another object of the invention is to provide a truck which lessens the destructiveness of shocks transmitted to the track, truck parts, or car body.

Still another object of the invention is to provide a truck with a spring arrangement which diminishes harmonic spring oscillations.

Yet another object of the invention is to provide a truck with a comparatively small amount of unsprung weight.

A further object is to provide a truck which fulfills all requirements of manufacture and service, and is of simple and economical construction.

A yet further object is to provide a car truck construction in which the spring suspension is such that the springs work in series whereby the same result may be obtained as if a single set of variable pitch springs were used.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a side elevation partly in section of a truck embodying the invention;

Figure 2 is an end elevation partly in section of the truck shown in Figure 1;

Figure 3 is a top plan view of one-half of the truck construction shown in Figure 1;

Figure 4 is an enlarged fragmentary sectional elevation of the tapered pedestal cooperating portion of the journal box construction.

In the form of truck shown the side frame 10 is of integral construction and is provided with the compression member 12 and the tension member 14. The tension and compression members merge adjacent their ends as at 16, said ends being provided with depending spaced pedestals 18 and 20 adapted to embrace journal boxes 22 cooperating with the journals 24 of the wheel and axle assemblies 26. The wheel and axle assembles, of course, may be of the standard A. R. A. construction, or of any other desired type. The journal boxes are fashioned in any desired manner for cooperation therewith.

The journal boxes 22 have extending and depending seats 28, one on each side of the box, said seats being provided with suitable dowels having cooperative and positioning engagement with the spring nests 30. Seats 32 and 34 are provided on the side frame below the top of the journal box, as shown, substantially on the center line of the wheel and axle assemblies, the seats 32 merging into the lower web 36 of the tension member 14, and each seat 34 merging into a section 38 of the side frame formed integral with the portion 16 and providing a bracket 40 for brake suspension, it being understood that the seats 32 and 34 are provided with suitable dowels for cooperating with and positioning the spring nests with respect to the seats 28.

The springs 30, although they may be of the usual form, are preferably helical springs of any given and suitable pitch, though it is to be understood that they may be formed with a varying pitch, or a plurality of pitches, all as described in application Serial No. 552,153, filed July 21, 1931. A suitable spring height of the springs 30 is provided by forming the journal box in a manner as described in application Serial No. 552,152, filed July 21, 1931, or briefly, the spring seats 28 are on a level below the bottom 42 of the journal box cellar, and at the same time this permits making the side frame pedestals 18 and 20 deep enough to provide ample bearing area and good guiding qualities for the journal box. A rib 44 is provided across the bottom of the journal box between the depending spring seats to serve as a strut or base between the spring seat portions and to reenforce them against bending inwardly under load. The load being transmitted equally by the springs arranged symmetrically on each side of the journal box, after it has been transmitted to the side frame, tends to prevent undesired tilting and binding of the journal boxes in the pedestals, and the load being applied to the journal boxes considerably below the mounting of the axle still further helps in this.

To further lessen the chance of binding between the journal box and pedestals, the faces of the journal box are made with a flat contact surface provided for guiding against the associated pedestal, but this surface extends vertically for a limited distance A to B in Figure 4 above and below the center of the journal, beyond which points the surfaces taper away as at C and D from the contact line. The normal clearance for vertical sliding between the box and the pedestals will thus permit a certain amount of tilting without binding, and this action is benefited by the shape described, thus permitting a certain small tilting action of the box without impairing its free vertical motion with respect to the side frame.

Should any wear take place as a result of the vertical motion of the journal boxes and side frame pedestals, it is desired that the side frame be free from such wear on account of the relatively high cost of renewal. The pedestals 18 and 20 therefore are provided with wearing plates 46 which take the wearing action, and are readily replaceable. These wearing plates are applied and held in place without any bolts, rivets, welding or similar attaching means, thus facilitating application or renewal. Each wearing plate has a bearing surface cooperating with the journal box with flanges 48 which serve as contact faces for the flanges 50 of the journal box and also serve to position the wearing plate laterally of the pedestal. The width across the side frame at the pedestals is made such as to accommodate the springs which are partially enclosed therein. The width of the side frame tension member 12 is preferably made substantially the same as the pedestal width, with the exception of the portion 38 and the bracket 40, so as to avoid kinks or bends in the side walls of this member which carries tension stresses. The portion of the side frame tension member between the spaced columns 52 forms a bolster spring seat and is preferably of box section for strength in carrying the superimposed load from the bolster 54, since in this respect this member is a beam as well as a tension member.

The side frames are tied together in position with respect to each other by means of a spring plank 56 extending therebetween and into the openings thereof between the columns 52. The bolster is provided with the center bearing 58 and the side bearing 60, the end portion of the bolster extending into the openings provided between the columns and being guided thereby by means of the embracing members 62 in cooperative relation with the column guides, the bolster being resiliently mounted on the spring plank, and thus on the side frame, by means of the nests of coil springs 64. The springs 64 are preferably of different stiffness and thus a different period of oscillation from those disposed between the journal boxes and pedestals, the two sets of springs thus working in series to produce the same results as may be obtained with one set of springs of variable pitch. The springs between the journal box and side frame may be of constant pitch and stiffness, and those between the side frame and bolster of variable pitch and stiffness, or vice-versa, or both sets may be of constant pitch but of different stiffnesses. In either case they will have different periods of oscillation and synchronous vibration of the two spring sets is avoided, thus avoiding synchronous oscillation of the car body.

With the type of truck described, the springs are placed at effective points, which improves riding qualities and diminishes shocks to the track, wheels, axles, journal bearings, and side frames. The arrangement of the springs diminishes harmonic amplified motion due to track irregularities, thereby giving steadier riding qualities and preventing amplification of motion or bouncing which might lead to derailment, and it is understood that I do not wish to be limited by the exact embodiment of the device shown which is merely by way of illustration and not limitation, as various and other forms of the device will of course be apparent to those skilled in the art without departing from the spirit of the invention or the scope of the claims.

I claim:

1. In a car truck, the combination of a side frame having a bolster opening, and having pedestals spaced to guide a journal box therebetween, a journal box disposed between said pedestals and having spring seats thereon below the journal box cellar, spring seats on said side frame adjacent said pedestals and substantially at axle level, springs between said journal box and side frame and disposed on opposite sides of said journal box, a bolster extending into said bolster opening, and springs supporting said bolster on said side frame, said last named springs having a different period of oscillation from said first named springs.

2. In a car truck, the combination of a side frame having a compression member, a tension member and columns spaced to form a bolster opening, said tension and compression members merging adjacent the ends thereof and having pedestals spaced to guide a journal box therebetween, a journal box disposed between said pedestals and having spring seats thereon, said spring seats having portions embracing said pedestals, spring seats on said side frame adjacent said pedestals and substantially at axle level, springs disposed on opposite sides of said journal box between said journal box and side frame, a bolster extending into said bolster opening, and springs supporting said bolster on said side frame, said last named springs having a different period of oscillation from said first named springs.

3. In a car truck, the combination of a side frame having a bolster opening, pedestals provided on said side frame and spaced to guide a journal box therebetween, a journal box disposed between said pedestals and having spring seats thereon, spring seats on said side frame adjacent said pedestals and substantially at axle level, springs between said journal box and side frame, a bolster extending into said bolster opening, and coil springs supporting said bolster on said side frame.

4. In a car truck, the combination of a side frame having a compression member provided with a straight horizontal upper chord, a tension member and columns spaced to form a bolster opening, said tension and compression members merging adjacent the ends thereof and having pedestals spaced to guide a journal box therebetween, a journal box disposed between said pedestals, springs between said journal box and side frame and substantially below axle level, a bolster extending into said bolster opening, and coil springs between said bolster and tension member and in said opening.

5. In a car truck, the combination of a side frame having a compression member provided with a straight horizontal upper chord, a tension member and columns spaced to form a bolster opening, said tension and compression members merging adjacent the ends thereof and having pedestals spaced to guide a journal box therebetween, a journal box disposed between said pedestals, springs between said journal box and side frame and substantially below axle level, a bolster extending into said bolster opening, and springs between said bolster and tension member and in said opening, said last named springs having a different period of oscillation from said first named springs.

6. In a truck, the combination of a side frame having tension and compression members and spaced column guides forming a window with said tension and compression members, a load carrying member resiliently supported in said window, said tension and compression members merging adjacent the ends of said side frame and provided with spaced jaws, a journal box slidably mounted in each of said jaws, said journal box being provided with spring seats on each side thereof disposed below the cellar of said journal box, said side frame having seats substantially at axle level, and resilient means disposed between said seats on said side frame and journal boxes.

7. In a truck, the combination of a side frame having tension and compression members and spaced column guides forming a window with said tension and compression members, a load carrying member supported in said window, said tension and compression members merging adjacent the ends of said side frame and provided with spaced jaws, a journal box slidably mounted in each of said jaws, said journal box being provided with spring seats on each side thereof disposed below the cellar of said journal box, said side frame having seats substantially at axle level, and resilient means disposed between said seats on said side frame and journal boxes.

8. In a truck, the combination of a side frame having tension and compression members and spaced column guides forming a window with said tension and compression members, a load carrying member supported in said window, said tension and compression members merging adjacent the ends of said side frame and provided with a bracket portion having a brake hanger support thereon, said tension member and said bracket portion having spaced spring seats disposed substantially at axle level, journal box receiving jaws disposed between said seats, a journal box disposed between said jaws and provided with spring seats disposed below the journal box cellar and aligned with said first named spring seats, and resilient means disposed between aligned spring seats.

9. In a truck, the combination of a side frame having tension and compression members and spaced column guides forming a window with said tension and compression members, a load carrying member supported in said window, said tension and compression members merging adjacent the ends of said side frame and provided with a bracket portion having a brake hanger support thereon, said tension member and said bracket portion having spaced spring seats disposed substantially at axle level, journal box receiving jaws disposed between said seats, a journal box disposed between said jaws and provided with spring seats aligned with said first named spring seats, and resilient means disposed between aligned spring seats said first named spring seats being disposed below the top of said journal box.

10. In a car truck, the combination of a side frame including tension and compression members and spaced integrally connecting column guides forming a window therewith, a load carrying member extending into said window and resiliently supported on the side frame, said tension and compression members merging adjacent the ends thereof and provided with spaced pedestals forming a pedestal opening with the merged portion of said tension and compression members, said tension member having a lower chord merging with the top of the pedestal opening, a spring seat disposed between one of said pedestals and the tension member below the top of said pedestal opening, a spring seat disposed adjacent the other pedestal and in substantial horizontal alignment with the first named spring seat, a journal box slidably received in said pedestals and provided on each side thereof with spring seats disposed below the journal box cellar, and coil springs interposed between the journal box seats and said first named seats.

11. In a car truck, the combination of a side frame including tension and compression members and spaced integrally connecting column guides forming a window therewith, said compression member being provided with a straight horizontal upper chord, a load carrying member extending into said window and resiliently supported on said tension member, said tension and compression members merging adjacent the ends thereof and provided with spaced pedestals forming a pedestal opening, said tension member having a lower chord merging with the top of said pedestal opening, spring seats disposed below the top of said pedestal opening, a journal box slidably received in said pedestals and provided on each side thereof with coil spring seats, and coil springs interposed between the journal box spring seats and said first named spring seats.

12. In a car truck, the combination of a side frame having tension and compression members and spaced integrally connecting column guides forming a window therewith, the upper chord of said compression member being disposed in a straight horizontal plane, a load carrying member extending into said window and resiliently supported on said tension member, said tension and compression members merging adjacent the ends thereof and provided with spaced pedestals, a journal box slidably received in said pedestals, a wheel and axle assembly having a journal end of said axle disposed to cooperate with said journal box, coil spring seats disposed on each side of said journal box, below the cellar thereof, said side frame being provided with coil spring seats on each side of said pedestals substantially in vertical alignment with the journal box seats and substantially at axle level, and coil springs interposed between the journal box seats and said other seats.

13. In a car truck, the combination of a side frame having tension and compression members and spaced integrally connecting column guides forming a window therewith, the upper chord of said compression member being disposed in a straight horizontal plane, a load carrying member extending into said window and resiliently supported on said tension member, said tension and compression members merging adjacent the ends thereof and provided with spaced pedestals, a journal box slidably received in said pedestals, a wheel and axle assembly having a journal end of said axle disposed to cooperate with said journal box, coil spring seats disposed on each side of said journal box, said side frame being provided with coil spring seats on each side of said pedestals substantially at axle level and substantially in vertical alignment with the journal box seats, and coil springs interposed between the journal box seats and said other seats.

WILLIAM C. HEDGCOCK.